(12) United States Patent
Clum et al.

(10) Patent No.: US 10,513,947 B2
(45) Date of Patent: Dec. 24, 2019

(54) ADJUSTABLE FLOW SPLIT PLATFORM COOLING FOR GAS TURBINE ENGINE

(71) Applicant: United Technologies Corporation, Farmington, CT (US)

(72) Inventors: Carey Clum, East Hartford, CT (US); Adam Generale, Dobbs Ferry, NY (US)

(73) Assignee: United Technologies Corporation, Farmington, CT (US)

( * ) Notice: Subject to any disclaimer, the term of this patent is extended or adjusted under 35 U.S.C. 154(b) by 409 days.

(21) Appl. No.: 15/613,686

(22) Filed: Jun. 5, 2017

(65) Prior Publication Data

US 2018/0347397 A1 Dec. 6, 2018

(51) Int. Cl.
| | |
|---|---|
| *F01D 5/18* | (2006.01) |
| *F01D 25/12* | (2006.01) |
| *F01D 9/04* | (2006.01) |
| *F02C 3/04* | (2006.01) |
| *F01D 17/10* | (2006.01) |

(52) U.S. Cl.
CPC ............ *F01D 25/12* (2013.01); *F01D 9/041* (2013.01); *F01D 17/105* (2013.01); *F02C 3/04* (2013.01); *F05D 2220/32* (2013.01); *F05D 2240/12* (2013.01); *F05D 2240/35* (2013.01); *F05D 2240/81* (2013.01); *F05D 2250/185* (2013.01); *F05D 2260/20* (2013.01)

(58) Field of Classification Search
CPC . F01D 5/18; F01D 5/181; F01D 5/182; F01D 5/183; F01D 5/185; F01D 5/186; F01D 5/187; F01D 9/041; F01D 17/105; F05D 2240/81
See application file for complete search history.

(56) References Cited

U.S. PATENT DOCUMENTS

| 5,320,483 A | 6/1994 | Cunha et al. |
| 5,356,265 A | 10/1994 | Kercher |
| 5,413,458 A | 5/1995 | Calderbank |
| (Continued) | | |

FOREIGN PATENT DOCUMENTS

| EP | 0911489 | 4/1999 |
| EP | 1136652 | 9/2001 |
| (Continued) | | |

OTHER PUBLICATIONS

European Patent Office, European Search Report dated Jul. 20, 2018 in Application No. 18164398.2-1006.

*Primary Examiner* — Ninh H. Nguyen
*Assistant Examiner* — Maxime M Adjagbe
(74) *Attorney, Agent, or Firm* — Snell & Wilmer, L.L.P.

(57) ABSTRACT

A turbine assembly may comprise a platform defining a platform cavity cooled by a platform flow with a vane extending from the platform. A platform-fed through cavity is defined by the vane and cooled by a first portion of the platform flow. A direct-fed through flow cavity is defined in the vane and cooled by a direct-fed through flow. The direct-fed through flow cavity and the platform-fed through cavity meet at an outlet to expel an outgoing through flow from the outlet. A platform-fed serpentine cavity may be defined in the vane and separated from the platform-fed through cavity by a divider. The platform-fed serpentine cavity is cooled by a second portion of the platform flow.

20 Claims, 3 Drawing Sheets

(56) References Cited

U.S. PATENT DOCUMENTS

| | | | |
|---|---|---|---|
| 5,645,397 A * | 7/1997 | Soechting | ............... F01D 5/187 |
| | | | 415/115 |
| 6,929,445 B2 | 8/2005 | Zatorski et al. | |
| 7,458,778 B1 | 12/2008 | Liang | |
| 8,197,184 B2 | 6/2012 | Chon | |
| 8,591,189 B2 | 11/2013 | Correia et al. | |
| 2003/0029790 A1 | 2/2003 | Templeton | |
| 2015/0030432 A1 * | 1/2015 | Smith | ..................... B23P 6/002 |
| | | | 415/115 |
| 2015/0369056 A1 | 12/2015 | Spangler | |

FOREIGN PATENT DOCUMENTS

| | | |
|---|---|---|
| EP | 2626519 | 8/2013 |
| EP | 3196415 | 7/2017 |
| WO | 2017003455 | 1/2017 |

\* cited by examiner

ADJUSTABLE FLOW SPLIT PLATFORM COOLING FOR GAS TURBINE ENGINE

GOVERNMENT LICENSE RIGHTS

This disclosure was made with government support under Contract No. FA8650-09-D-2923-0021 awarded by the United States Air Force. The government has certain rights in the disclosure.

FIELD

The disclosure relates generally to gas turbine engines and, more particularly, to cooling airflow internal to turbomachinery components.

BACKGROUND

Engine components in gas turbines are exposed to high temperatures during use. Many components are internally cooled to counteract high ambient conditions. In conventional airfoil design cooling flow is fed through one airfoil and may be used to cool the next. These cooling feeds either come 100% from the platform cooling passages or 100% from the direct feed source. The cooling flows present difficulties when taking into consideration the airfoil body temperature with the temperature that is supplied to the airfoil downstream (e.g., exiting the airfoil). Controlling exit temperatures and/or pressures from cooling chambers may thus be difficult when the cooling flow is supplied 100% from the cooling cavities or 100% from a direct source.

SUMMARY

A turbine assembly is provided. The turbine assembly may comprise a platform defining a platform cavity cooled by a platform flow with a vane extending from the platform. A platform-fed through cavity is defined by the vane and cooled by a first portion of the platform flow. A direct-fed through flow cavity is defined in the vane and cooled by a direct-fed through flow. The direct-fed through flow cavity and the platform-fed through cavity meet at an outlet to expel an outgoing through flow from the outlet. A platform-fed serpentine cavity may be defined in the vane and separated from the platform-fed through cavity by a divider. The platform-fed serpentine cavity is cooled by a second portion of the platform flow.

In various embodiments, a blade may be disposed aft of the vane and be cooled by the outgoing through flow. A trailing edge cavity may be in fluid communication with the platform-fed serpentine cavity. The second portion of the platform flow is exhausted from the trailing edge cavity into a core flow. The through flow and the first portion of the platform flow mix at the outlet to form the outgoing through flow. The platform-fed through cavity may be in fluid communication with the platform cavity. The through flow may be extracted from a compressor stage of a gas turbine engine.

A gas turbine engine is also provided. A compressor may be configured to compress a core flow with a combustor in fluid communication with the compressor and configured to combust the core flow. A turbine may be disposed aft of the combustor and configured to expand the core flow. The turbine may include a platform defining a platform cavity cooled by a body flow. A vane may extend from the platform. A platform-fed through cavity may be defined by the vane and cooled by a first portion of the platform flow. A direct-fed through cavity may be defined in the vane and cooled by a through flow. The direct-fed through cavity and the platform-fed through cavity meet at an outlet. A platform-fed serpentine cavity may be defined in the vane and separated from the platform-fed through cavity. The platform-fed serpentine cavity is cooled by a second portion of the platform flow.

In various embodiments, a may be disposed blade aft of the vane in the turbine and cooled by the outgoing through flow. A trailing edge cavity may be in fluid communication with the platform-fed serpentine cavity. The second portion of the platform flow may be exhausted from the trailing edge cavity into the core flow. The through flow and the first portion of the platform flow mix at the outlet to form the outgoing through flow. The platform-fed through cavity may be in fluid communication with the platform cavity. The cooling flow source for direct-fed through cavities and/or for the platforms may be bled from the core flow in the compressor section.

A vane is also provided. The vane may have a vane platform defining a platform cavity, and a platform-fed through cavity defined by the vane and in fluid communication with the platform cavity. A direct-fed through cavity may be defined in the vane. The direct-fed through cavity and the platform-fed through cavity may meet at an outlet. A platform-fed serpentine cavity may be defined in the vane and separated from the platform-fed through cavity by a divider. The platform-fed serpentine cavity may be in fluid communication with the platform cavity.

In various embodiments, a trailing edge cavity may be fluid communication with the platform-fed serpentine cavity. The trailing edge cavity may be configured to exhaust a body flow. The outlet may be configured to mix a through flow from the direct-fed through cavity and a body flow from the platform-fed serpentine cavity. The platform-fed through cavity and the platform-fed serpentine cavity may be cooled by a body flow exiting the platform cavity. The direct-fed through cavity may be cooled by a direct cooling source.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosures, it should be understood that other embodiments may be realized and that logical, chemical, and mechanical changes may be made without departing from the spirit and scope of the disclosures. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

The present disclosure relates to cooling components in gas turbine engines. The internally cooled components may draw cooling flow from two or more sources that meet and pass through the component as through flow. The use of separate cooling-flow sources enables balance of the pick-up of the head load between the two sources. If the platform-fed coolant flow through the airfoil is too hot, then some heat load may be absorbed by the direct-fed through flow. If the direct-fed through flow is too hot, then some of the platform heat load can be absorbed by the platform-fed through flow.

Figure 1:
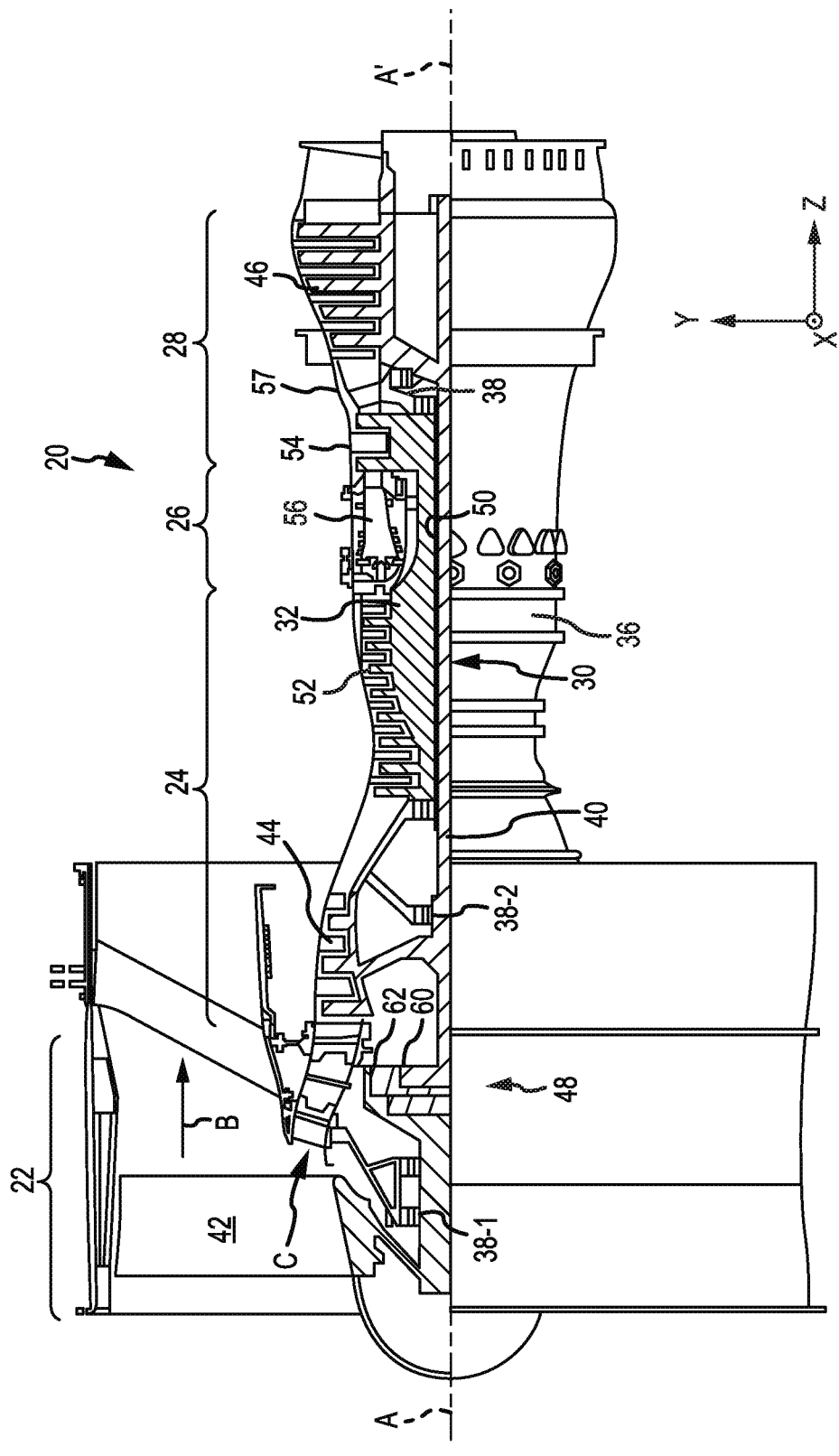
FIG. 1 illustrates a cross-sectional view of an exemplary gas turbine engine, in accordance with various embodiments.

With reference to FIG. 1, a gas turbine engine 20 is shown according to various embodiments. Gas turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive coolant (e.g., air) along a path of bypass airflow B while compressor section 24 can drive coolant along a core flowpath C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 or engine case via several bearing systems 38, 38-1, and 38-2. Engine central longitudinal axis A-A' is oriented in the z direction on the provided x-y-z axes. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure compressor 44 and a low pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 and high pressure turbine 54. A combustor 56 may be located between high pressure compressor 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The airflow of core flowpath C may be compressed by low pressure compressor 44 then high pressure compressor 52, mixed and burned with fuel in combustor 56, then expanded over high pressure turbine 54 and low pressure turbine 46. Turbines 46, 54 rotationally drive the respective low speed spool 30 and high speed spool 32 in response to the expansion. The cooling flow source for direct-fed through cavities and/or for the platform cavities described herein may be bled from the core flow in compressor section 24.

Gas turbine engine 20 may be, for example, a high-bypass ratio geared aircraft engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about five (5). In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about five (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans. A gas turbine engine may comprise an industrial gas turbine (IGT) or a geared aircraft engine, such as a geared turbofan, or non-geared aircraft engine, such as a turbofan, or may comprise any gas turbine engine as desired.

Figure 2:
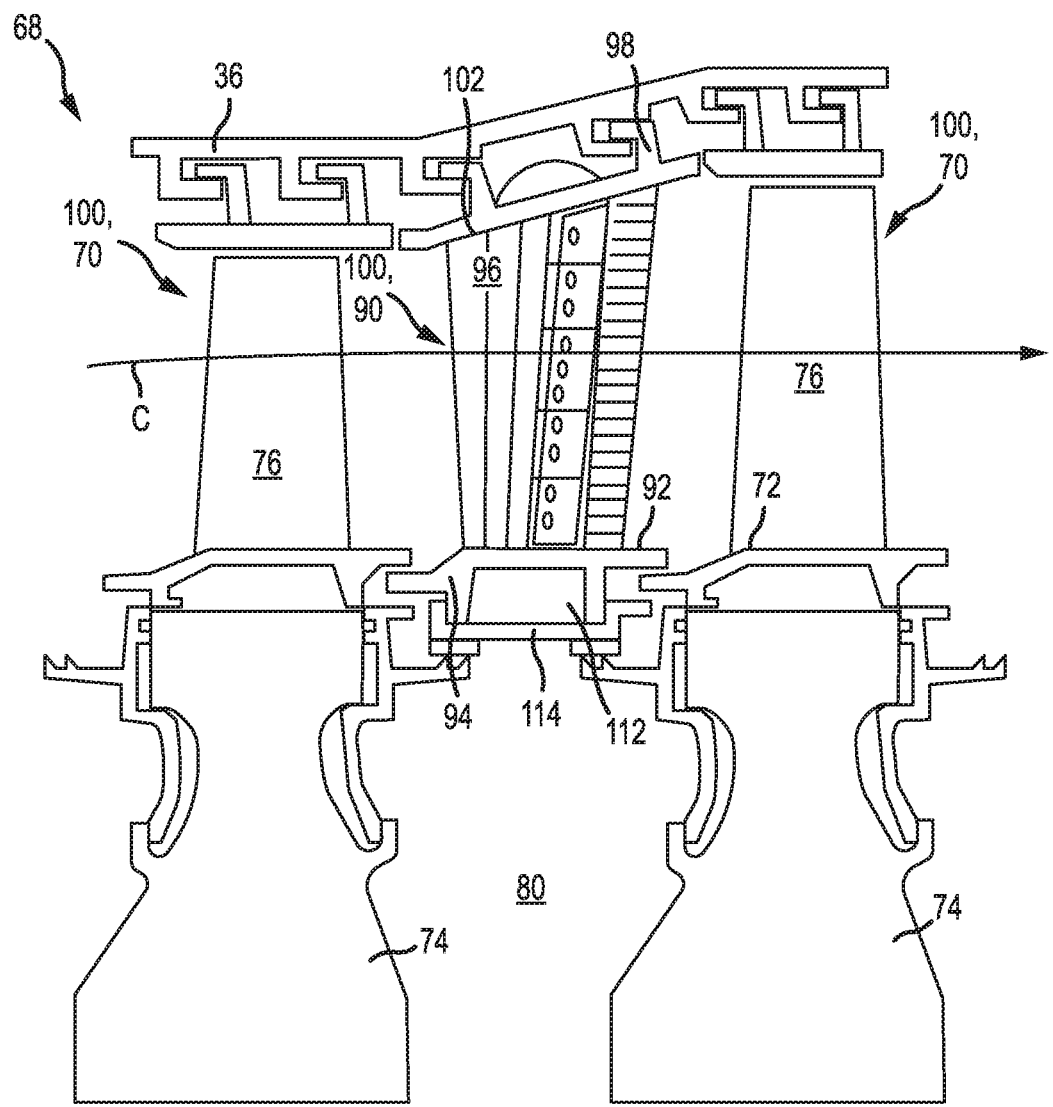
FIG. 2 illustrates an engine section including example airfoils, such as a blade and a vane of an exemplary gas turbine engine, according to various embodiments.

Referring now to FIG. 1 and to FIG. 2, according to various embodiments, each of low pressure compressor 44, high pressure compressor 52, low pressure turbine 46, and high pressure turbine 54 in gas turbine engine 20 may comprise one or more stages or sets of rotating blades and one or more stages or sets of stationary vanes axially interspersed with the associated blade stages but non-rotating about engine central longitudinal axis A-A'. Each compressor stage and turbine stage may comprise multiple interspersed stages of blades 70 and vanes 90. The blades 70 rotate about engine central longitudinal axis A-A', while the vanes 90 remain stationary with respect to engine central longitudinal axis A-A'. Blades 70 and vanes 90 may be referred to as airfoils 100. For example, FIG. 2 schematically shows, by example, a portion of an engine section 68, which is illustrated as a turbine section 28 of gas turbine engine 20.

With reference to FIG. 2, a schematic view of a portion of engine section 68 is shown, in accordance with various embodiments. Engine section 68 may include a circumferential array of blades 70 coupled about a circumference of a generally circular disk 74. Disk 74 may be disposed radially inward of core flowpath C and centered on the rotation axis of the gas turbine engine. Disk 74 with blades 70 may be configured to rotate about engine central longitudinal axis A-A'. Each blade 70 may include an airfoil body 76 with a platform disposed at an inner diameter end wall 72 of the blade 70. A disk cavity 80 may be defined between a forward disk and an aft disk. Upstream (forward) and downstream (aft) of blades 70 are circumferential arrays of vanes 90 configured to guide core flowpath C through the engine section 68.

Each vane 90 may include an airfoil body 96 with an inner diameter platform 94 disposed at an inner diameter end wall 92 of vane 90 and with an outer diameter platform 98 disposed at an outer diameter end wall 102 of vane 90. Outer diameter platform 98 may be coupled to engine case structure 36. Inner diameter platform 94 and/or outer diameter platform 98 may be coupled to or integral with vane 90. Airfoils 100 may be internally cooled engine components. Airfoils 100 may thus define internal cooling passages having serpentine geometry.

Figure 3:
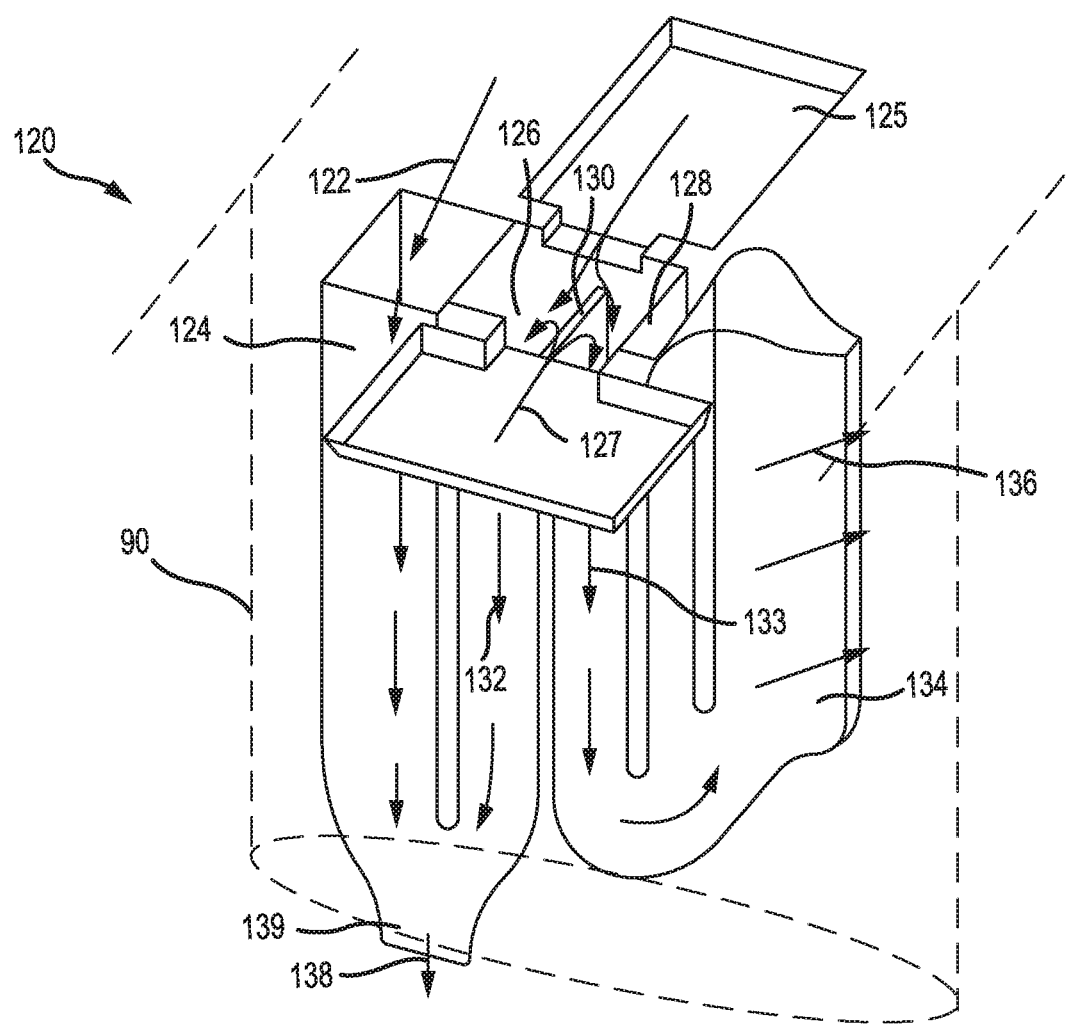
FIG. 3 illustrates an internal cooling cavity suitable for use in a vane to mix separate cooling flows and modulate the cooling flow exiting the vane towards the adjacent blade, in accordance with various embodiments.

With reference to FIG. 3, cooling system 120 internal to vane 90 is shown, in accordance with various embodiments. Vane 90 may comprise an array of internal cooling cavities including a direct-fed through cavity 124, a platform-fed through cavity 126 separated by the platform-fed serpentine cavity 128 by divider 130, and a trailing edge cavity 134.

In various embodiments, platform cavity 125 may be in fluid communication with platform-fed through cavity 126 and platform-fed serpentine cavity 128. Platform-fed flow 127 may cool the platform surrounding platform cavity 125 and flow into platform-fed through cavity 126 and platform-fed serpentine cavity 128 defined in airfoil 100. The relative percentages flowing into platform-fed through cavity 126 and platform-fed serpentine cavity 128 may be determined by divider 130 between the two cavities. Divider 130 may be positioned to meter the platform flow into the platform-fed flow cavities based on the relative cross-sectional area of the platform-fed through cavity 126 and platform-fed serpentine cavity 128. Divider 130 may thus be a wall formed between platform-fed through cavity 126 and platform-fed serpentine cavity 128.

In various embodiments, a platform-fed serpentine flow 133 may flow into platform-fed serpentine cavity 128 towards trailing edge cavity 134. Platform-fed serpentine flow 133 may exit from trailing edge cavity 134 as exit flow 136 into core flow path C (of FIG. 1).

In various embodiments, direct-fed through flow 122 from a direct coolant source may flow into direct-fed through cavity 124 towards outlet 139. A platform-fed through flow 132 may flow into the platform-fed through cavity 126 towards outlet 139. Platform-fed through flow 132 and direct-fed through flow 122 may meet and mix at outlet 139 and exit vane 90 as outgoing through flow 138. Outgoing through flow 138 may be directed to an adjacent blade 70 (of FIG. 2) to cool the blade.

In various embodiments, components cooled by the mixed flow of the present disclosure may allow the flexibility to reduce or increase through flow exit temperature, while the coolant temperature to the serpentine would respond in an opposite manner. The through flow may absorb additional heat load in response to the platform-fed flow temperature elevating to relatively high temperatures. The platform-fed flow may absorb additional heat load in response to the through flow temperature elevating to relatively high temperatures.

In various embodiments, cooling system 120 in airfoils may be made using an additive manufacturing technique such as direct metal laser sintering, selective laser sintering, selective laser melting, electron-beam melting, or electron-beam freeform fabrication. Casting may also be used to form cooling cavities of airfoil 100. To cast an airfoil 100 or another internally cooled component having cooling passages, a core may be formed. The core of the component wall may have features of the cooling cavities. In that regard, cooling cavities may be formed in a core as positive material. The core may then be placed in a mold, and the material to form the internally cooled component may be deposited in the mold. The core may later be removed from the internally cooled component, leaving a cavity with the desired geometry. Airfoil 100 (as well as other internally cooled components) may be made from an austenitic nickel-chromium-based alloy or other materials capable of withstanding exhaust temperatures.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures.

The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiment Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A turbine assembly comprising:
   a platform defining a platform cavity cooled by a platform flow;
   a vane extending from the platform;
   a platform-fed through cavity defined by the vane and cooled by a first portion of the platform flow;
   a direct-fed through cavity defined by the vane and cooled by a through flow, wherein the direct-fed through cavity and the platform-fed through cavity meet at an outlet to expel an outgoing through flow from the outlet; and
   a platform-fed serpentine cavity defined by the vane and separated from the platform-fed through cavity by a divider, wherein the platform-fed serpentine cavity is cooled by a second portion of the platform flow.

2. The turbine assembly of claim 1, further comprising a blade aft of the vane, wherein the blade is cooled by the outgoing through flow.

3. The turbine assembly of claim 1, further comprising a trailing edge cavity in fluid communication with the platform-fed serpentine cavity.

4. The turbine assembly of claim 3, wherein the second portion of the platform flow is exhausted from the trailing edge cavity into a core flow.

5. The turbine assembly of claim 1, wherein the through flow and the first portion of the platform flow mix at the outlet to form the outgoing through flow.

6. The turbine assembly of claim 1, wherein the platform-fed through cavity is in fluid communication with the platform cavity.

7. The turbine assembly of claim 1, wherein the through flow is extracted from a compressor stage of a gas turbine engine.

8. A gas turbine engine comprising:
   a compressor configured to compress a core flow;
   a combustor in fluid communication with the compressor and configured to combust the core flow;
   a turbine aft of the combustor and configured to expand the core flow, the turbine comprising:
      a platform defining a platform cavity having a platform-fed flow exiting the platform;
      a vane extending from the platform;
      a platform-fed through cavity defined by the vane and cooled by a first portion of the platform-fed flow;
   a direct-fed through cavity defined by the vane and cooled by a through flow, wherein the direct-fed through cavity and the platform-fed through cavity meet at an outlet; and
   a platform-fed serpentine cavity defined by the vane and separated from the platform-fed through cavity, wherein the platform-fed serpentine cavity is cooled by a second portion of the platform-fed flow.

9. The gas turbine engine of claim 8, further comprising a blade aft of the vane in the turbine, wherein the blade is cooled by the outgoing through flow.

10. The gas turbine engine of claim 8, further comprising a trailing edge cavity in fluid communication with the platform-fed serpentine cavity.

11. The gas turbine engine of claim 10, wherein the second portion of the platform-fed flow is exhausted from the trailing edge cavity into the core flow.

12. The gas turbine engine of claim 8, wherein the through flow and the first portion of the platform-fed flow mix at the outlet to form the outgoing through flow.

13. The gas turbine engine of claim 8, wherein the platform-fed through cavity in fluid communication with the platform cavity.

14. The gas turbine engine of claim 8, wherein the through flow is bled from the core flow in the compressor.

15. A vane comprising:
   a vane platform defining a platform cavity;
   a platform-fed through cavity defined by the vane and in fluid communication with the platform cavity;
   a direct-fed through cavity defined by the vane, wherein the direct-fed through cavity and the platform-fed through cavity meet at an outlet; and
   a platform-fed serpentine cavity defined by the vane and separated from the platform-fed through cavity by a divider, wherein the platform-fed serpentine cavity is in fluid communication with the platform cavity, wherein the outlet is configured to mix a through flow from the direct-fed through cavity and a platform-fed flow from the platform-fed through cavity.

16. The vane of claim 15, further comprising a trailing edge cavity in fluid communication with the platform-fed serpentine cavity.

17. The vane of claim 16, wherein the trailing edge cavity is configured to exhaust a platform-fed flow.

18. The vane of claim 15, wherein the platform-fed through cavity and the platform-fed serpentine cavity are cooled by a platform-fed flow exiting the platform cavity.

19. The vane of claim 15, wherein the direct-fed through cavity is cooled by a direct cooling source.

20. A vane comprising:
   a vane platform defining a platform cavity;
   a platform-fed through cavity defined by the vane and in fluid communication with the platform cavity;
   a direct-fed through cavity defined by the vane, wherein the direct-fed through cavity and the platform-fed through cavity meet at an outlet; and
   a platform-fed serpentine cavity defined by the vane and separated from the platform-fed through cavity by a divider, wherein the platform-fed serpentine cavity is in fluid communication with the platform cavity, wherein the direct-fed through cavity is cooled by a direct cooling source and the platform-fed through cavity is cooled by a platform flow.

* * * * *